(12) United States Patent
Iszlai et al.

(10) Patent No.: US 8,260,932 B2
(45) Date of Patent: Sep. 4, 2012

(54) USING BROADCAST DOMAINS TO MANAGE VIRTUAL LOCAL AREA NETWORKS

(75) Inventors: Gabriel Iszlai, Toronto (CA); Radu Bogdan Mateescu, Toronto (CA); Paul-Vlad Tatavu, North York (CA)

(73) Assignee: International Business Machines Corporation, Armonk, NY (US)

( * ) Notice: Subject to any disclaimer, the term of this patent is extended or adjusted under 35 U.S.C. 154(b) by 2221 days.

(21) Appl. No.: 11/115,423

(22) Filed: Apr. 27, 2005

(65) Prior Publication Data

US 2006/0248196 A1 Nov. 2, 2006

(51) Int. Cl.
*G06F 15/16* (2006.01)
*G06F 15/177* (2006.01)
(52) U.S. Cl. .......... 709/227; 709/220; 709/221; 709/222
(58) Field of Classification Search .......... 709/220–222, 709/227; 370/395.53
See application file for complete search history.

(56) References Cited

U.S. PATENT DOCUMENTS

| | | | | |
|---|---|---|---|---|
| 5,878,232 A * | 3/1999 | Marimuthu | ................... | 709/249 |
| 5,968,126 A * | 10/1999 | Ekstrom et al. | ................... | 709/225 |
| 5,978,378 A * | 11/1999 | Van Seters et al. | ........... | 370/401 |
| 6,085,238 A * | 7/2000 | Yuasa et al. | ................... | 709/223 |
| 6,208,649 B1 * | 3/2001 | Kloth | ........................... | 370/392 |
| 6,678,241 B1 | 1/2004 | Gai et al. | ...................... | 370/216 |
| 6,757,298 B1 | 6/2004 | Burns et al. | ................... | 370/473 |
| 7,154,861 B1 * | 12/2006 | Merchant et al. | ............. | 370/254 |
| 7,301,946 B2 * | 11/2007 | Meier et al. | ................... | 370/390 |
| 2003/0101239 A1 * | 5/2003 | Ishizaki | ...................... | 709/219 |
| 2003/0130833 A1 | 7/2003 | Brownell et al. | ............... | 703/23 |
| 2003/0165140 A1 * | 9/2003 | Tang et al. | ..................... | 370/393 |
| 2004/0064545 A1 | 4/2004 | Miyake | ......................... | 709/224 |
| 2004/0213211 A1 * | 10/2004 | Green | ........................... | 370/352 |
| 2004/0218551 A1 | 11/2004 | Goldberg et al. | ............. | 370/256 |
| 2004/0223501 A1 * | 11/2004 | Mackiewich et al. | ......... | 370/401 |
| 2004/0252722 A1 * | 12/2004 | Wybenga et al. | ............. | 370/474 |
| 2004/0264364 A1 | 12/2004 | Sato | .............................. | 370/217 |
| 2005/0066020 A1 | 3/2005 | Wechter et al. | ............... | 709/223 |
| 2005/0066036 A1 | 3/2005 | Gilmartin | ..................... | 709/226 |
| 2005/0180345 A1 * | 8/2005 | Meier | ........................... | 370/310 |

* cited by examiner

*Primary Examiner* — Kenny Lin
*Assistant Examiner* — Noel Beharry
(74) *Attorney, Agent, or Firm* — Yee & Associates, P.C.; John D. Flynn (57) ABSTRACT

In an embodiment of the present invention there is provided a method of managing virtual local area networks (VLANs) using abstract broadcast domains. First, a first broadcast domain having a first VLAN is established. Next, a second broadcast domain having a second VLAN is established. A third broadcast domain is then established, replacing both the first broadcast domain and the second broadcast domain. Thus, the first VLAN and the second VLAN are included in the third broadcast domain without having to physically manipulate switches or otherwise manipulate the logical connection between data processing systems. After aggregation, the first VLAN directly communicates with the second VLAN.

4 Claims, 8 Drawing Sheets

USING BROADCAST DOMAINS TO MANAGE VIRTUAL LOCAL AREA NETWORKS

BACKGROUND OF THE INVENTION

1. Technical Field

The present invention relates generally to an improved data processing system and in particular to a method and apparatus for processing data. Still more particularly, the invention relates to management of virtual local area networks.

2. Description of Related Art

Modern networks of computers can involve extremely complex connections among a vast number of data processing systems. To assist in managing networks, a network characterization scheme has been developed, called the open system interconnection (OSI) reference model. This model has seven layers. Each of these layers specifies particular network functions such as addressing, flow control, error control, encapsulation, and reliable message transfer. Layer one, the physical layer, includes cables, routers, switches, and data processing machines. Layer two, the data link layer, includes broad aggregations of data processing systems, such as local area networks (LANs) and virtual local area networks (VLANs). The data link layer is implemented using software and/or hardware. Layers three through seven, the network layer, the transport layer, the session layer, the presentation layer, and the application layer respectively, include other functions. For example, layer three includes Internet protocol addresses, and layer four includes hypertext transfer protocol (HTTP) information.

Often, system administrators desire to manipulate the scope of LANs and VLANs to control what data processing systems can directly communicate with or "see" other data processing systems. A data processing system can directly communicate with or "see" other data processing systems if no translation of data is required as data is transferred between data processing systems. For example, data processing systems connected via a group of switches or Ethernet hubs usually directly communicate with each other because, for most switching and Ethernet hub configurations, all data processing systems communicate with each other without translation. On the other hand, if a group of data processing systems are connected via routers, then the data processing systems usually do not directly communicate with each other because, for most router configurations, some translation of data between the data processing systems is required.

Currently, manipulation of a LAN or a VLAN often requires physical manipulation of routers and/or switches. Additionally, an intensive analysis of the logical structure of the network also is required. For large networks, this process is difficult, time consuming, and error prone. Thus, it would be advantageous to have a method, apparatus, and computer instructions for manipulating the data link layer of a network without having to physically manipulate switches or perform an intensive analysis of the logical structure of a network.

SUMMARY OF THE INVENTION

Embodiments of the present invention provide a method, apparatus, and computer instructions for managing virtual local area networks (VLANs) using abstract broadcast domains. A first broadcast domain having a first VLAN is established, and a second broadcast domain having a second VLAN is established. Subsequently, a third broadcast domain is established such that the third broadcast domain replaces the first broadcast domain and the second broadcast domain. The first VLAN and the second VLAN are included in the third broadcast domain without having to physically manipulate switches or otherwise manipulate the logical connection between data processing systems. After aggregation, the first VLAN directly communicates with the second VLAN.

BRIEF DESCRIPTION OF THE DRAWINGS

The novel features believed characteristic of embodiments of the invention are set forth in the appended claims. Embodiments of the invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
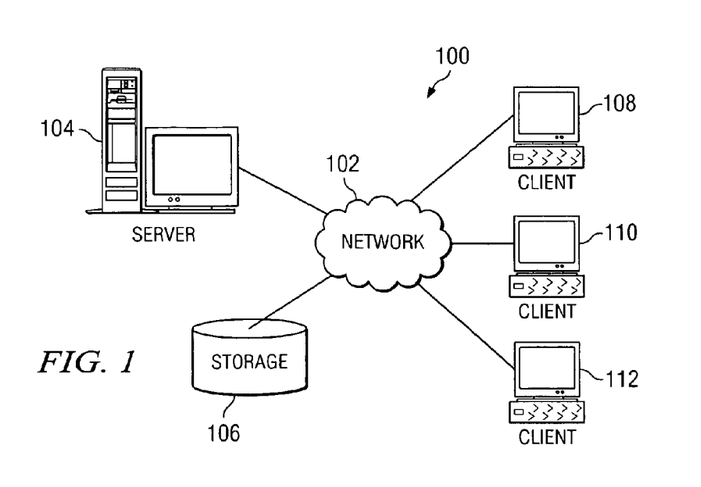
FIG. 1 depicts a pictorial representation of a network of data processing systems in which embodiments of the present invention may be implemented.

With reference now to the figures, FIG. 1 depicts a pictorial representation of a network of data processing systems in which embodiments of the present invention may be implemented. Network data processing system 100 is a network of computers in which embodiments of the present invention may be implemented. Network data processing system 100 contains a network 102, which is the medium used to provide communications links between various devices and computers connected together within network data processing system 100. Network 102 may include connections, such as wire, wireless communication links, or fiber optic cables.

In the depicted example, server 104 is connected to network 102 along with storage unit 106. In addition, clients 108, 110, and 112 are connected to network 102. These clients 108, 110, and 112 may be, for example, personal computers or network computers. In the depicted example, server 104 provides data, such as boot files, operating system images, and applications to clients 108-112. Clients 108, 110, and 112 are clients to server 104. Network data processing system 100 may include additional servers, clients, and other devices not shown. In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, government, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for embodiments of the present invention.

Figure 2:
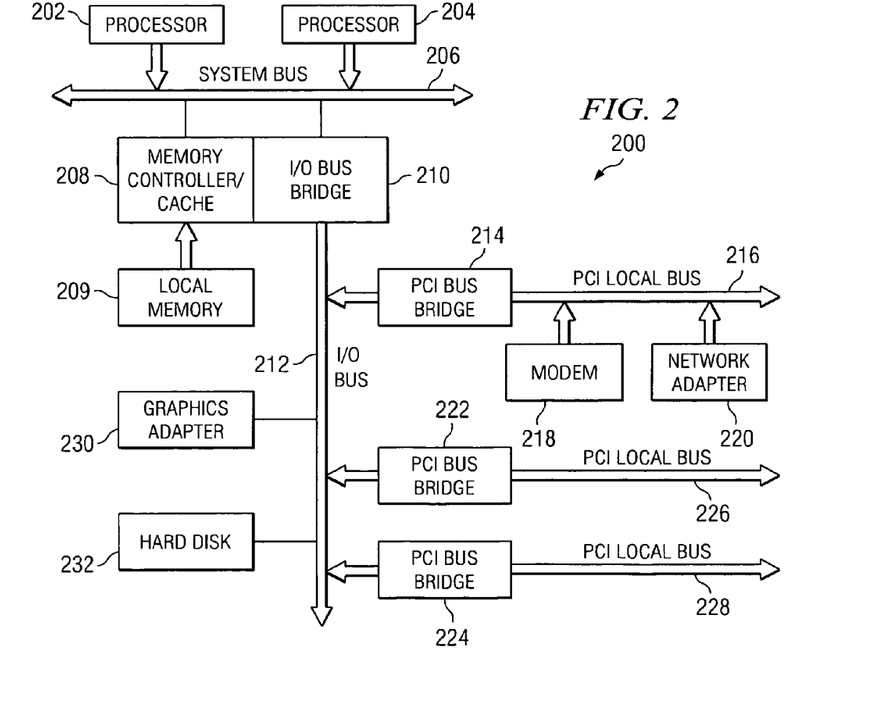
FIG. 2 is a block diagram of a data processing system that may be implemented as a server in which embodiments of the present invention may be implemented.

Referring to FIG. 2, a block diagram of a data processing system that may be implemented as a server, such as server 104 in FIG. 1, is depicted in accordance with an embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O Bus Bridge 210 is connected to system bus 206 and provides an interface to I/O bus 212. Memory controller/cache 208 and I/O Bus Bridge 210 may be integrated as depicted.

Peripheral component interconnect (PCI) bus bridge 214 connected to I/O bus 212 provides an interface to PCI local bus 216. A number of modems may be connected to PCI local bus 216. Typical PCI bus implementations will support four PCI expansion slots or add-in connectors. Communications links to clients 108-112 in FIG. 1 may be provided through modem 218 and network adapter 220 connected to PCI local bus 216 through add-in connectors.

Additional PCI bus bridges 222 and 224 provide interfaces for additional PCI local buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to embodiments of the present invention.

The data processing system depicted in FIG. 2 may be, for example, an IBM eServer pSeries system, a product of International Business Machines Corporation in Armonk, N.Y., running the Advanced Interactive Executive (AIX) operating system or LINUX operating system.

Figure 3:
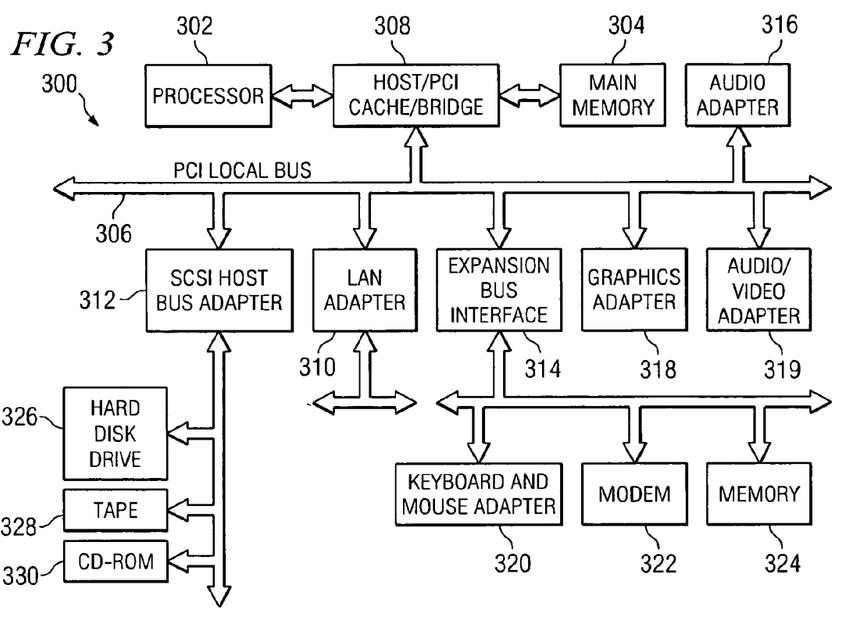
FIG. 3 is a block diagram illustrating a data processing system in which embodiments of the present invention may be implemented.

With reference now to FIG. 3, a block diagram illustrating a data processing system is depicted in which embodiments of the present invention may be implemented. Data processing system 300 is an example of a client computer. Data processing system 300 employs a peripheral component interconnect (PCI) local bus architecture. Although the depicted example employs a PCI bus, other bus architectures such as Accelerated Graphics Port (AGP) and Industry Standard Architecture (ISA) may be used. Processor 302 and main memory 304 are connected to PCI local bus 306 through PCI Bridge 308. PCI Bridge 308 also may include an integrated memory controller and cache memory for processor 302. Additional connections to PCI local bus 306 may be made through direct component interconnection or through add-in boards. In the depicted example, local area network (LAN) adapter 310, small computer system interface (SCSI) host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots. Expansion bus interface 314 provides a connection for a keyboard and mouse adapter 320, modem 322, and additional memory 324. SCSI host bus adapter 312 provides a connection for hard disk drive 326, tape drive 328, and CD-ROM drive 330. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system, such as Windows XP, which is available from Microsoft Corporation. An object oriented programming system such as Java may run in conjunction with the operating system and provide calls to the operating system from Java programs or applications executing on data processing system 300. "Java" is a trademark of Sun Microsystems, Inc. Instructions for the operating system, the object-oriented programming system, and applications or programs are located on storage devices, such as hard disk drive 326, and may be loaded into main memory 304 for execution by processor 302.

Those of ordinary skill in the art will appreciate that the hardware in FIG. 3 may vary depending on the implementation. Other internal hardware or peripheral devices, such as flash read-only memory (ROM), equivalent nonvolatile memory, or optical disk drives and the like, may be used in addition to or in place of the hardware depicted in FIG. 3. In addition, the processes of embodiments of the present invention may be applied to a multiprocessor data processing system.

As another example, data processing system 300 may be a stand-alone system configured to be bootable without relying on some type of network communication interfaces. As a further example, data processing system 300 may be a personal digital assistant (PDA) device, which is configured with ROM and/or flash ROM in order to provide non-volatile memory for storing operating system files and/or user-generated data.

The depicted example in FIG. 3 and above-described examples are not meant to imply architectural limitations. For example, data processing system 300 also may be a notebook computer or hand held computer in addition to taking the form of a PDA. Data processing system 300 also may be a kiosk or a Web appliance.

Embodiments of the present invention provide a method, apparatus, and computer instructions for managing virtual local area networks (VLANs) using abstract broadcast domains. A first broadcast domain having a first VLAN is established, and a second broadcast domain having a second VLAN is established. Subsequently, a third broadcast domain is established such that the third broadcast domain replaces the first broadcast domain and the second broadcast domain. The first VLAN and the second VLAN are included in the third broadcast domain without having to physically manipulate switches or otherwise manipulate the logical connection between data processing systems. After aggregation, the first VLAN directly communicates with the second VLAN.

The first broadcast domain and the second broadcast domain are aggregated into the third broadcast domain by establishing a trunk between the first broadcast domain and the second broadcast domain. Thus, regardless of the switches involved in establishing the first and second VLANs, the first and second VLANs are part of the third broadcast domain. After aggregation, the first VLAN directly communicates with the second VLAN. The process of aggregation is described in further detail with regard to FIG. 7, FIG. 8A, and FIG. 8B.

Figure 4:
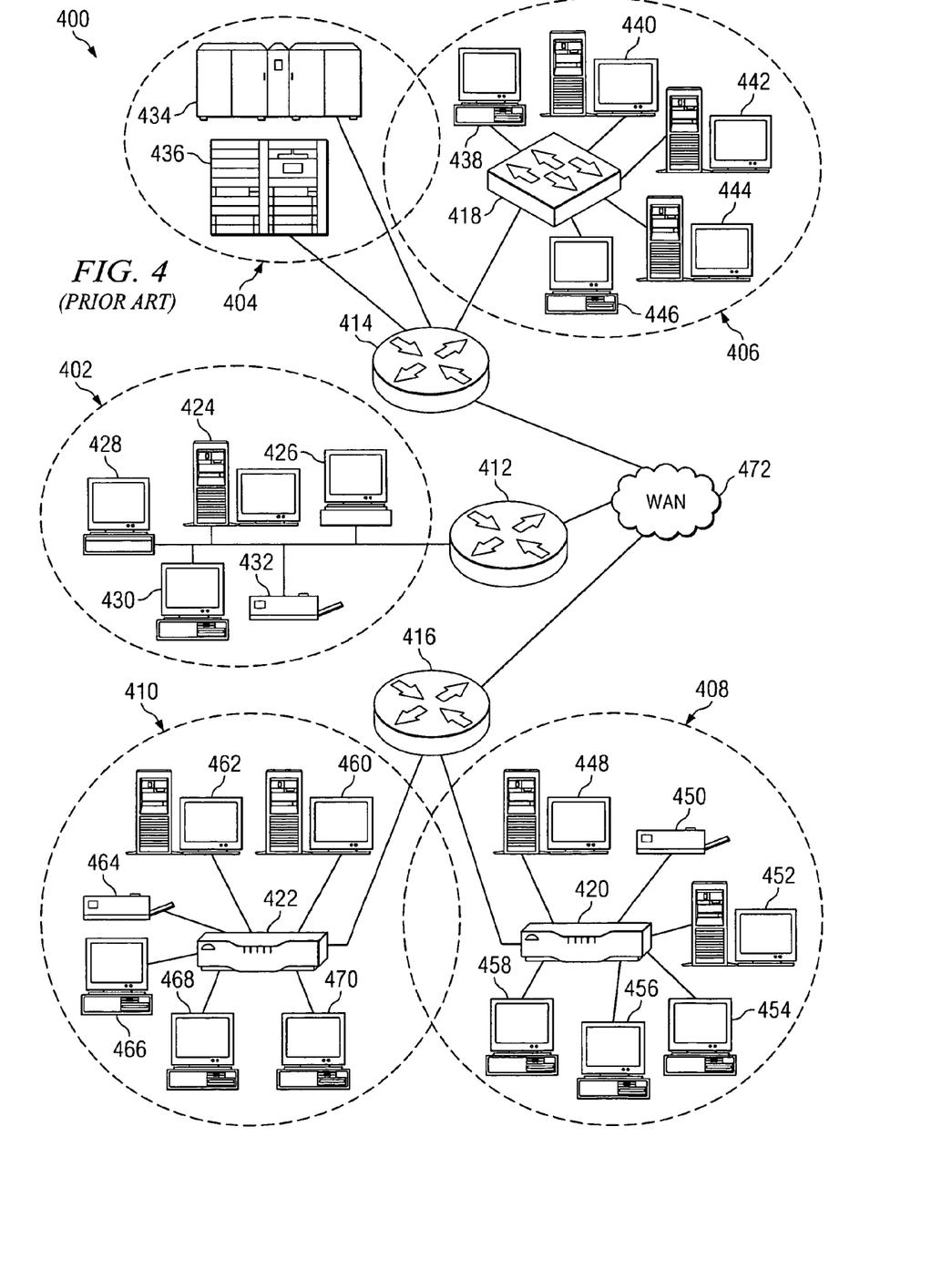
FIG. 4 is a block diagram representing a known group of local area networks connected via routers.

FIG. 4 is a block diagram representing a known group 400 of local area networks connected via routers. Each of the data processing systems shown in FIG. 4 may be a server computer, such as server 104 in FIG. 1; a client computer, such as clients 108, 110, and 112 in FIG. 1; client system 200 in FIG. 2; or server system 300 in FIG. 3. Wide area network 472 may be a network such as the Internet or network 102 shown in FIG. 1.

Each local area network of data processing systems is circled in phantom to indicate that the physical objects located within the circle are part of one local area network. Thus, the group of local area networks shown in FIG. 4 includes local area networks 402, 404, 406, 408, and 410. Each local area network includes a number of data processing systems. For example, local area network 402 includes data processing systems 424, 426, 428, and 430 as well as printer 432, which may also be considered a data processing system. Local area network 402 is connected to a wide area network 472 via router 412.

Each of the data processing systems in local area network 402 is connected to each other via a ThinNet Ethernet, which is implemented using physical cables and appropriate hardware and software. Thus, each of the data processing systems shown in local area network 402 can "see" each other in the manner described above. However, none of the data processing systems shown in local area network 402 can directly communicate with data processing systems in the other local area networks, except via router 412 and wide area network 472. Thus, a data processing system in one LAN cannot "see" a data processing system in another LAN in the manner described above.

Local area networks may comprise a wide variety of types and numbers of data processing systems. For example, local area network 404 includes mini computer 434 and mainframe 436 connected to wide area network 472 via router 414. Local area network 406 includes data processing systems 438, 440, 442, 444, and 446 connected via Ethernet switch 418. Local area network 406 communicates with wide area network 472 via router 414. Similarly, local area network 408 includes data processing systems 448, 450, 452, 454, 456, and 458 connected via Ethernet hub 420 and local area network 410 includes data processing systems 460, 462, 464, 466, 468, and 470 connected via Ethernet hub 422. In the latter two local area networks, both local area network 408 and local area network 410 are connected to wide area network 472 via router 416.

An advantage to the configuration shown in FIG. 4 is that each of the data processing systems can easily and quickly communicate with any other data processing system in a given local area network. In addition, data processing systems in one local area network are relatively isolated from data processing systems in another local area network. Thus, traffic at the mainframe 436 in local area network 404 does not necessarily clog traffic arriving at local area network 410. In addition, local area network 406 is relatively isolated from local area network 402, such that data in one local area network may be secured from users in the other local area network.

However, a disadvantage of the configuration shown in FIG. 4 is that data processing systems in one local area network cannot communicate as quickly with data processing systems in another local area network. For example, transferring data for a print command issued from data processing system 448 in local area network 408 to printer 464 in local area network 410 will likely take longer than transferring data for a print command issued from data processing system 466 in local area network 410 to printer 464 in local area network 410. The data and commands must be routed through two Ethernet hubs, Ethernet hubs 420 and 422, as well as through one router, router 416.

The print command and associated data transfer could take even longer if the print command had been issued to printer 432 in local area network 402 because then the command and data would have to pass through Ethernet hub 420, router 416, wide area network 472, and router 412. Thus, the configuration shown in FIG. 4 can result in the problem of slow processing of tasks between data processing systems in different local area networks. A current method of solving this problem is shown in FIG. 5.

Figure 5:
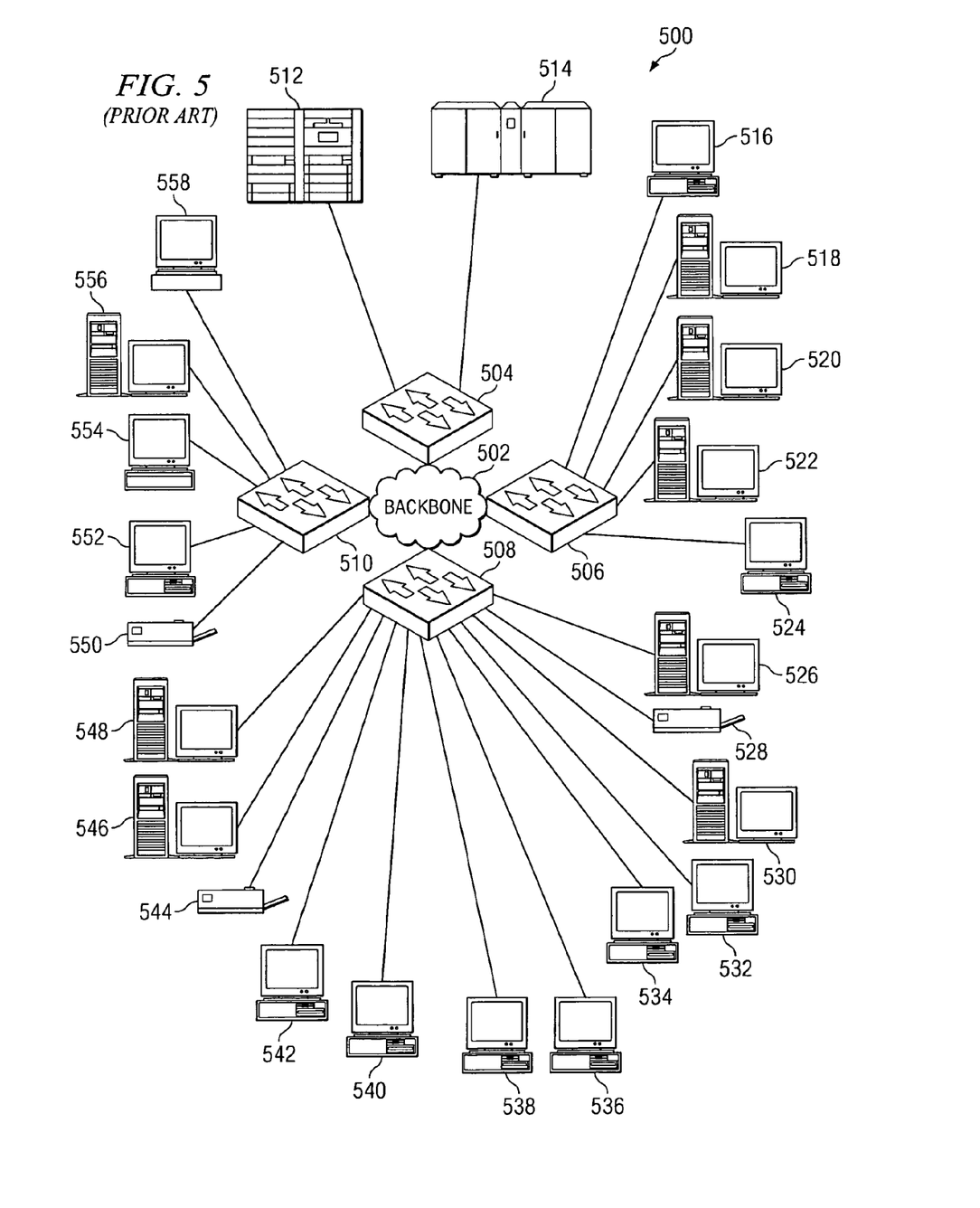
FIG. 5 is a block diagram representing a known network connected via Ethernet switches.

FIG. 5 is a block diagram representing a known network 500 connected via Ethernet switches. Data processing systems shown in FIG. 5 correspond to data processing systems shown in FIG. 4. However, in the configuration shown in FIG. 5, every data processing system can "see," or directly communicate, with each other in the manner described above. A group of Ethernet switches, such as switches 504, 506, 508, and 510, are connected to a backbone 502. Backbone 502 is a network of data processing systems designed to transmit large amounts of data at very high transfer rates. Each Ethernet switch is physically located at a geographic location and physical cables connect the Ethernet switches to backbone 502.

In the example shown in FIG. 5, mini computer 512, mainframe 514, and data processing systems 516, 518, 520, 522, 524, 526, 528, 530, 532, 534, 536, 538, 540, 542, 544, 546, 548, 550, 552, 554, 556, and 558 all directly communicate with each other. Thus, the configuration shown in FIG. 5 results in fast data transfer rates between data processing systems at different physical locations, especially when compared to data transfer rates between corresponding data processing systems in different local area networks shown in FIG. 4.

However, a disadvantage of the configuration shown in FIG. 5 derives from its advantage. Because every data processing system can "see" each other, data traffic deriving from one data processing system, such as mainframe 514, can clog the entire network. Thus, the configuration shown in FIG. 5 can result in the problem of data traffic in the entire network becoming slow. Furthermore, because each data processing system can "see" every other data processing system, a user at one data processing system can access any other data processing system on the network. Thus, the configuration shown in FIG. 5 may create the problem of a security risk. A solution to the problems of the configuration shown in FIG. 5 is shown in FIG. 6.

Figure 6:
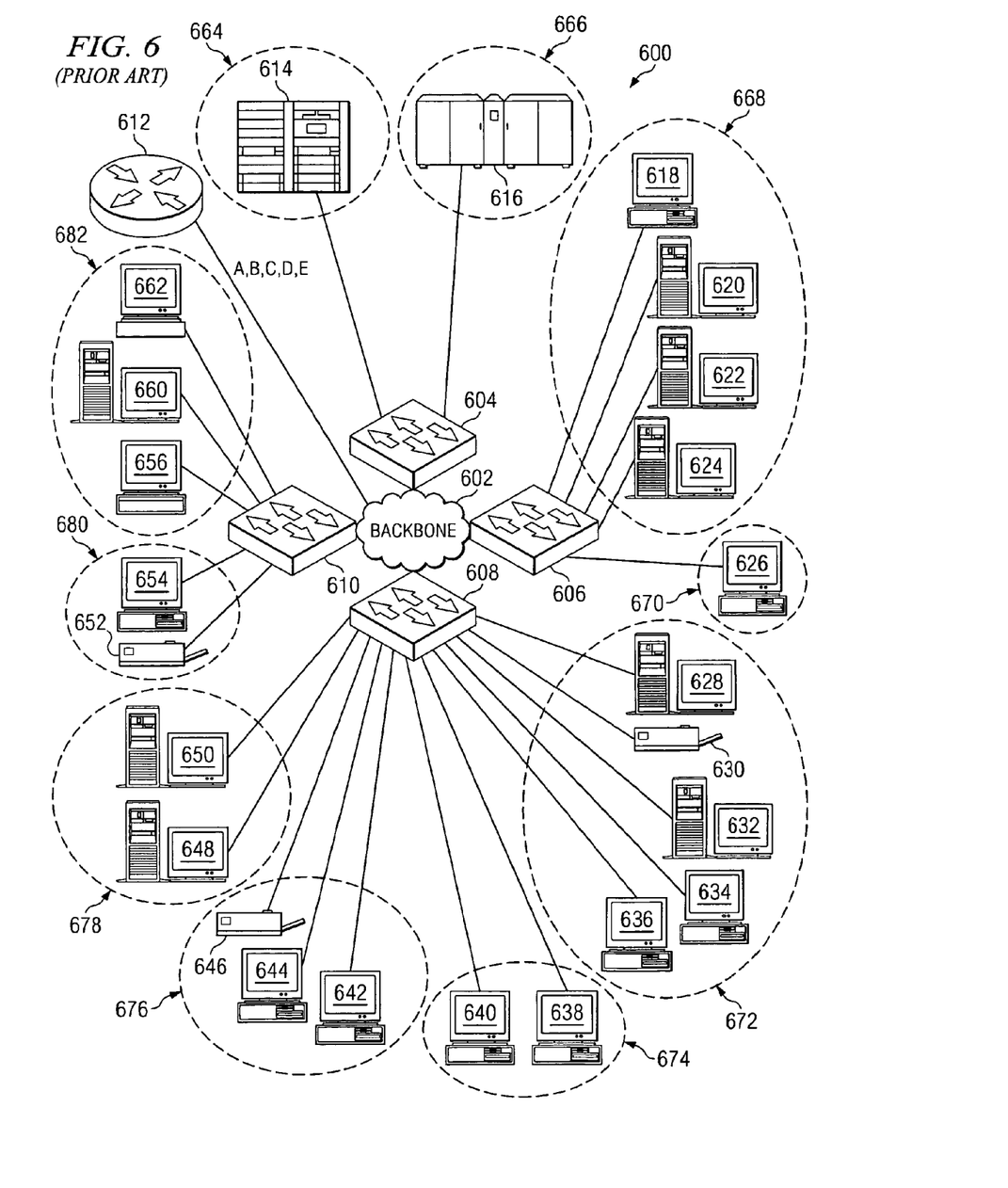
FIG. 6 is a block diagram representing a group of VLANs in which embodiments of the present invention may be implemented.

FIG. 6 is a block diagram representing a group 600 of virtual local area networks (VLANs) in which embodiments of the present invention may be implemented. In order to isolate certain data processing systems from directly "seeing" each other, a VLAN is used. A VLAN groups a set of data processing systems together and isolates this set of data processing systems from other data processing systems on a larger network, such as the network shown in FIG. 5. A VLAN is implemented using software and/or hardware, such as multiplexed switches. Each VLAN can include many data processing systems.

In the configuration shown in FIG. 6, each of the data processing systems shown correspond to similar data processing systems shown in FIG. 5. In this illustrative example, however, a group of VLANs is present. In this example, VLAN 664 contains mini computer 614; VLAN 666 contains mainframe 616; VLAN 668 contains data processing systems 618, 620, 622, and 624; VLAN 670 contains data processing system 626; VLAN 672 contains data processing systems 628, 630, 632, 634, and 636; VLAN 674 contains data processing systems 638 and 640; VLAN 676 contains data processing systems 642, 644, and 646; VLAN 678 contains data processing systems 648 and 650; VLAN 680 contains data processing systems 652 and 654; and VLAN 682 contains data processing systems 656, 660, and 662.

Each VLAN is connected to backbone 602 via an Ethernet switch. However, multiple VLANs may be connected to each Ethernet switch. Thus, VLAN 664 and 666 connect to backbone 602 via Ethernet switch 604; VLANs 668 and 670 connect to backbone 602 via Ethernet switch 606; VLANs 672, 674, 676, and 678 connect to Ethernet switch 608; and VLANs 680 and 682 connect to backbone 602 via Ethernet switch 610. In turn, backbone 602 may connect to a wider network, such as the Internet, via one or more routers, such as router 612.

In the exemplary configuration shown in FIG. 6, each Ethernet switch connects all data processing systems at a physical location to backbone 602. Each VLAN, however, prevents data processing systems both within a physical location and outside a physical location from directly communicating with data processing systems in other VLANs. Consequently, the configuration shown in FIG. 6 achieves high security because a user of a data processing system in one VLAN cannot directly access a data processing system in another VLAN, at least not without using a password, using a user identification, or satisfying some other established security measure. In addition, because switches are used instead of routers, data transfer rates between data processing systems in different VLANs are much faster.

As FIG. 6 illustrates, the set of VLANs may be quite complex, though the complexity of VLANs may be much greater than that shown in FIG. 6. In large groups of VLANs, it is often desirable to change the definitions of VLANs so that different data processing systems can "see" each other. For example, the administrator at a particular physical location represented by Ethernet switch 608 may wish to combine VLAN 678 and VLAN 674 into a single VLAN and also remove data processing system 642 from VLAN 676. However, changes in the VLANs may be difficult to implement when analyzing and adjusting different physical or logical switches. In this situation, the mechanism of embodiments of the present invention, includes a method of manipulating abstract broadcast domains of VLANS, which is especially useful when handling large numbers of switches.

Figure 7:
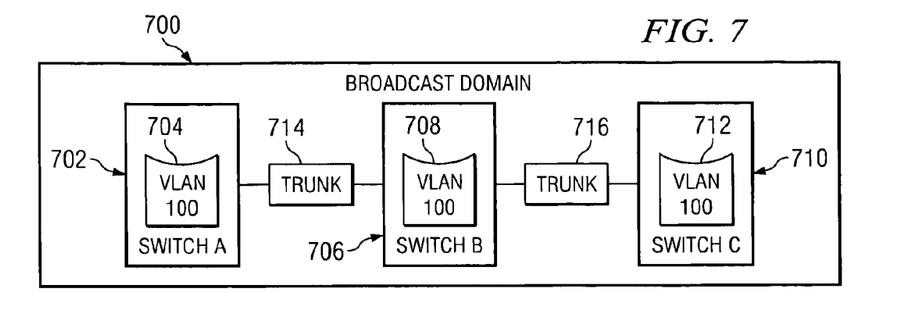
FIG. 7 is a block diagram representing a broadcast domain of VLANs in accordance with an embodiment of the present invention.

FIG. 7 is a block diagram representing a broadcast domain of VLANs in accordance with an embodiment of the present invention. A broadcast domain is a collection of nodes interconnected through links. The broadcast domain represents a unified view of a domain discriminator. The domain discriminator is the VLAN number, which determines the scope of the domain. For example, two switches with a VLAN 100 are defined with respect to both switches. A trunk exists between the 2 switches, so a broadcast domain exists. If a third switch does not have a VLAN 100 created on it, the third switch cannot be part of the broadcast domain because all nodes in the domain need to have the same domain discriminator.

A broadcast domain also may be considered the set of all data processing systems that will receive broadcast frames originating from any data processing system within the set. Physically, a broadcast domain also may be conceptualized as a collection of switches interconnected through multiplexed logical connections on which a specific VLAN is created. A broadcast domain is bounded by VLANs.

Regarding the terms used above, a frame is a logical grouping of information sent as a data link layer unit over a transmission medium. A node is the base element of the domain; the node represents the hosting environment for the domain discriminator.

A link is a logical connection between two nodes. At the data link layer, a link is represented by a trunk which transports the domain discriminator. A domain discriminator is the information which can be used to differentiate broadcast domains. In the mechanisms of embodiments of the present invention, a domain discriminator is a distributed VLAN.

In addition, OSI layer one topology can provide services to multiple data link layer domains. For example, a switch may service more than one VLAN. Thus, one physical switch may be a node in multiple broadcast domains. Similarly, a physical connection may be mapped to a trunk carrying more than one VLAN. Accordingly, multiple VLANs may be implemented using the same group of switches. For example, a VLAN 100 may exist on the same group of switches that support a VLAN 200.

The configuration shown in FIG. 7 may be implemented in a network, such as network 600 shown in FIG. 6. Each VLAN in FIG. 7 may include one or more data processing systems, such as server 104 in FIG. 1; a client computer, such as clients 108, 110, and 112 in FIG. 1; client system 200 in FIG. 2; or server system 300 in FIG. 3. Thus, all data processing systems in a broadcast domain are connected via switches as described in FIG. 5 and FIG. 6, though VLANs partially isolate groups of data processing systems from each other.

In the abstract network configuration shown in FIG. 7, broadcast domain 700 includes three groups of VLANs, including VLAN 704, VLAN 708, and VLAN 712. The number 100 next to each VLAN shows that each VLAN contains 100 data processing systems. The number 100 also indicates the domain discriminator for each of VLANs 704, 708, and 712. Each data processing system in VLAN 704 is connected to switch A 702; each data processing system in VLAN 708 is connected to switch B 706; and each data processing system in VLAN 712 is connected to switch C 710. In turn, switch A is connected to switch B via trunk 714 and switch B is connected to switch C via trunk 716. Thus, a data processing system in VLAN 704 can transfer data to a data processing system in VLAN 708 via trunk 714. Similarly, a data processing system in VLAN 702 can transfer data to a data processing system in VLAN 712 via trunk 714, switch B 706, and trunk 716.

In the configuration shown in FIG. 7, trunk 714 forwards data link layer frames tagged with information from VLAN 704 and VLAN 708. Similarly, trunk 716 forwards data link layer frames tagged with information from VLAN 708 and VLAN 712. A frame is the logical grouping of information sent as a data link layer unit over a transmission medium. Thus, in the illustrative example shown in FIG. 7, switch A 702, switch B 706, and switch C 710 are nodes in broadcast domain 700.

Figure 8A:
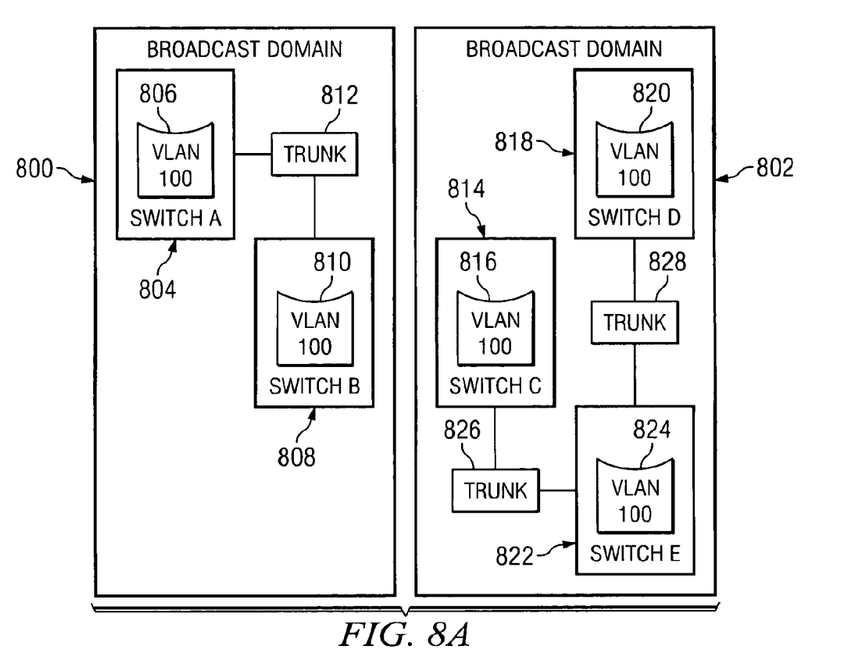
FIG. 8A is a block diagram representing a group of segregated broadcast domains of VLANs in accordance with an embodiment of the present invention.
Figure 8B:
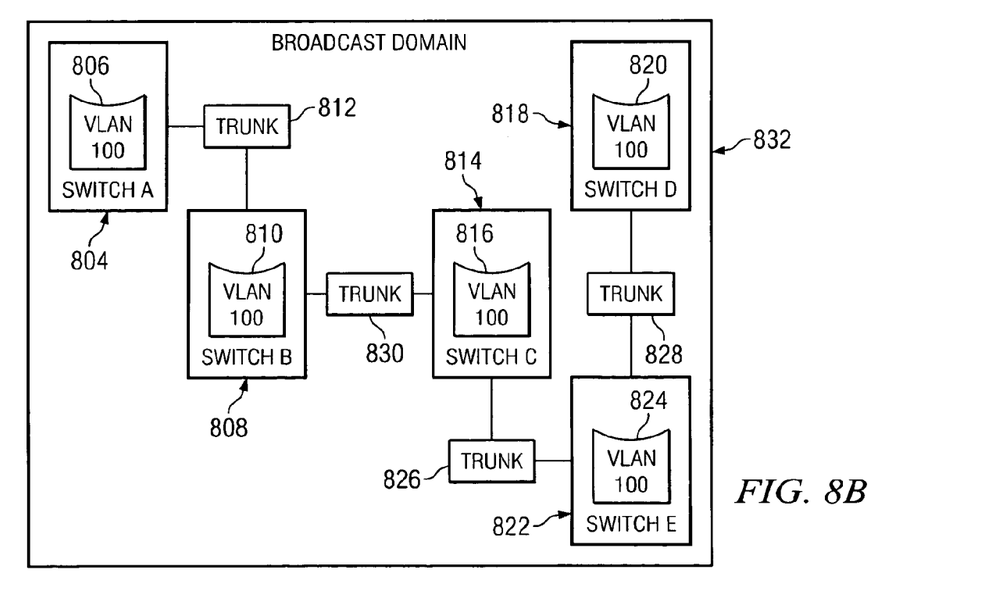
FIG. 8B is a block diagram representing an aggregated broadcast domain of VLANs in accordance with an embodiment of the present invention.

FIG. 8A is a block diagram representing a group of segregated broadcast domains of VLANs in accordance with an embodiment of the present invention. Each broadcast domain shown in FIG. 8A and FIG. 8B is an abstract representation of virtual local area networks and data processing systems, as described in relation to FIG. 7. In the illustrative embodiment shown in FIG. 8A, a system administrator desires to connect all of the VLANs in broadcast domain 800 and broadcast domain 802 to each other.

Initially, broadcast domain 800 contains VLAN 806 and VLAN 810 connected via trunk 812. The data processing systems in VLAN 806 are connected to switch A 804 and the data processing systems in VLAN 810 are connected to switch B 808. Similarly, broadcast domain 802 initially contains VLAN 816 connected to VLAN 824 via trunk 826 and also contains VLAN 820 connected to VLAN 824 via trunk 828. The data processing systems in VLAN 816 are connected to switch C 814, the data processing systems in VLAN 820 are connected to switch D 818, and the data processing systems in VLAN 824 are connected to switch E 822. The various switches shown in FIG. 8A and FIG. 8B are involved in forming the various trunks shown.

Using a method of embodiments of the present invention described below, physically implementing the connection between switches is avoided by manipulating the broadcast domains at an abstract level. In the illustrative embodiment shown in FIG. 8A, broadcast domains 800 and 802 may be aggregated into a single broadcast domain, 832.

FIG. 8B is a block diagram representing an aggregated broadcast domain of VLANs in accordance with an embodiment of the present invention. Reference numerals in FIG. 8A and FIG. 8B correspond to each other to show that the VLANs, switches, and trunks remain the same.

To aggregate broadcast domains 800 and 802, the system administrator or automatic program adds a logical trunk, 830, between VLAN 810 and VLAN 816. The system administrator then transforms trunk 830 into a domain link to carry common VLAN information between switches 808 and 814 involved in the aggregation.

For example, between switches 808 and 814 a physical connection already exists. (A physical connection is a prerequisite for aggregating broadcast domains.) In order to establish a trunk, the trunking attributes of each endpoint are changed. In this illustrative example, switch ports on the switches are trunking endpoints. In addition, the domain discriminator, or VLAN number, is associated with the trunk in order to have the trunk forward frames tagged with VLAN 100 between the two switches. Thus, the next step is to add the VLAN 100 to the trunk. Once the VLAN number is added to both trunk endpoints, the two separated domains will be consolidated into a larger one.

The trunk is also a connection between two switches. The trunk does not have to be recreated if two other domains are to be joined with a discriminator such as, for example, a VLAN 200. In this case, the trunk would have to be configured to carry VLAN 200 as well as VLAN 100.

To implement a trunk, an operator or an automation routine, such as a script, will identify the two endpoints of the trunk, which in the illustrative embodiment are two switch ports. In the case of a script or automation routine, the script or automation routine includes computer usable program code configured to perform the steps described below. The operator or automation routine will change the attributes of these two endpoints from access, or permanent non-trunking mode, to trunk mode, which is permanent trunking mode. At this point, a trunk is established between the two switches. The trunk can be represented as a pair of two endpoints or as a single object, such as a pipe.

In an illustrative embodiment, an operator connects to each switch to implement a trunk. The operator changes the switch port attributes to bring the switch port into trunking mode. The operator then adds a VLAN, such as a VLAN 100, to the list of VLANs carried through that switch port.

Data structures used to implement the trunk may include a database table that maintains information about each endpoint, or switch in the exemplary illustrative embodiment. The information may contain the attributes of each endpoint, the VLANs carried through each endpoint, and other information. Data structures for implementing the mechanisms of embodiments of the present invention are further described in relation to FIG. 10, below.

Broadcast domains 800 and 802 carry the same discriminator and define expanded broadcast domain 832. As a result, a single broadcast domain, 832, is created. By manipulating broadcast domains in this manner, all VLANs 806, 810, 816, 820, and 824 can communicate with each other, though physically manipulating switches may be avoided. Thus, regardless of the number of switches involved, data link layer connectivity may be manipulated easily between a limited number of nodes.

Aggregation of broadcast domains does have two prerequisites. First, all domains involved in aggregation must be connected at the layer one topology. In other words, some physical connection must link all physical systems in the involved broadcast domains. Second, the broadcast domains involved in aggregation must have the same domain discriminator; in other words, abstract VLANs must have the same number.

Nevertheless, as stated above, a switch may host more then one broadcast domain. No restrictions apply to the number of broadcast domains hosted by a switch or a group of switches, as long as all VLANS, or domain discriminators, that are carried through the trunks are established between switches. Thus, different broadcast domains with different domain discriminators may simultaneously exist on the same group of physical switches. However, inside a broadcast domain all VLANs have the same number. Otherwise, the broadcast frames will be improperly tagged and communication may not be possible.

Figure 9A:
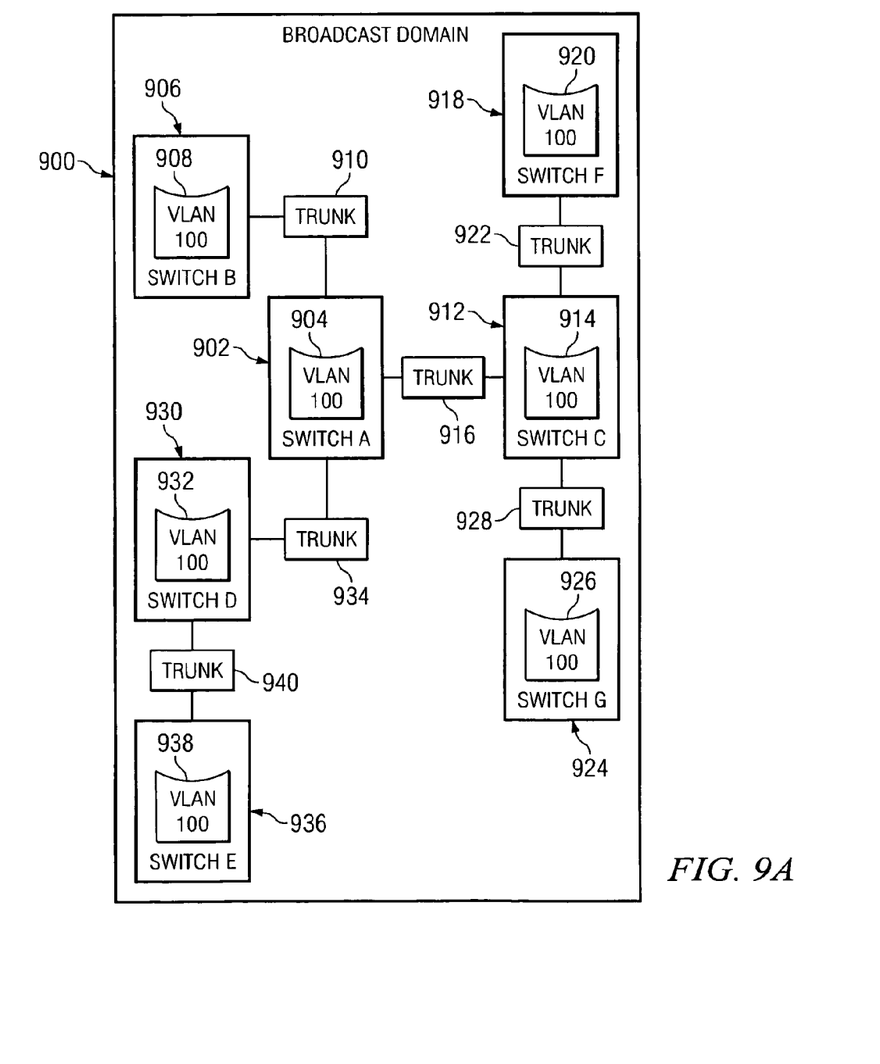
FIG. 9A is a block diagram representing a broadcast domain of VLANs in accordance with an embodiment of the present invention.
Figure 9B:
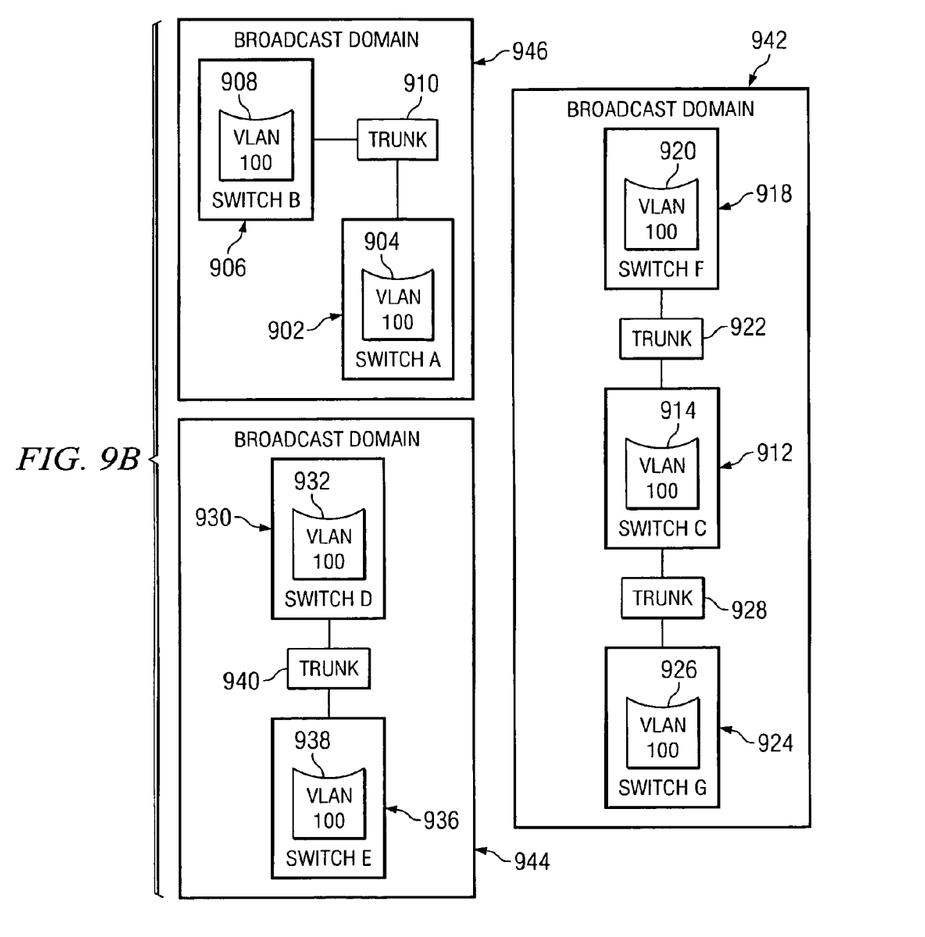
FIG. 9B is a block diagram representing a group of segregated broadcast domains of VLANs in accordance with an embodiment of the present invention.

FIG. 9A is a block diagram representing a broadcast domain of VLANs in accordance with an embodiment of the present invention. Each broadcast domain shown in FIG. 9A and FIG. 9B is an abstract representation of virtual local area networks and data processing systems, as described in relation to FIG. 7. FIG. 9A and FIG. 9B together illustrate an example of segregating a broadcast domain into multiple broadcast domains. In the illustrative embodiment shown in FIG. 9A and FIG. 9B, the term device is interchangeable with the term data processing system.

In the illustrative embodiment shown in FIG. 9A, broadcast domain 900 includes VLAN 904 connected to VLAN 908 via trunk 910. The devices in VLAN 904 are connected to switch A 902 and the devices in VLAN 908 are connected to switch B 906. Similarly, VLAN 914 is connected to VLAN 904 via trunk 916, VLAN 914 is connected to VLAN 920 via trunk 922, and to VLAN 926 via trunk 928. The devices in VLAN 914 are connected to switch C 912, the devices in VLAN 920 are connected to switch F 918, and the devices VLAN 926 are connected to switch G 924. Similarly, VLAN 904 is connected to VLAN 932 via trunk 934 and VLAN 932 is connected to VLAN 938 via trunk 940. The devices in VLAN 932 are connected to switch D 930 and the devices in VLAN 938 are connected to switch E 936. In addition, the various switches shown in FIG. 9A and FIG. 9B are involved in forming the various trunks shown. Using inventive methods described below, the broadcast domain shown in FIG. 9A is segregated into multiple broadcast domains shown in FIG. 9B for the purpose of disconnecting VLANs from each other.

FIG. 9B is a block diagram representing a group of segregated broadcast domains of VLANs in accordance with an embodiment of the present invention. Reference numerals in FIG. 9B correspond to similar reference numerals in FIG. 9A to show that no physical changes occur as broadcast domain 900 is segregated.

To segregate broadcast domain 900, a system administrator or an automatic program, such as a script, removes a node from a broadcast domain. In the case of a script or automation routine, the script or automation routine includes computer usable program code configured to perform the steps described below. Alternatively, the link between two nodes is removed by either stopping propagation of a domain discriminator from one node to another, or by removing the logical connection. In the latter case, the trunk is still present, but the VLANs are no longer carried through the trunk. In the former case, the trunk is removed. As a result of segregation, sub-domains are generated. Each of the sub-domains defines a distinct discriminator, even if all resultant sub-domains operate on the same VLAN.

In the embodiment shown in FIG. 9B, broadcast domain 900 is segregated into broadcast sub-domain 942, broadcast sub-domain 944, and broadcast sub-domain 946 using a single step. Trunk 916 is removed or a domain discriminator is no longer propagated through trunk 916. Similarly, trunk 934 is removed or a domain discriminator is no longer propagated through trunk 934.

Thus, segregation of domains can be accomplished in a single step that would otherwise require many operations, possibly involving many different switches. Sub-domains 942, 944, and 946 preserve all the properties of a data link layer broadcast domain, thus reconfiguration of switches involved in those domains is not necessary. Without the mechanism of embodiments of the present invention, all trunks would have to be monitored in order to ensure that the desired isolation is achieved.

Figure 10:
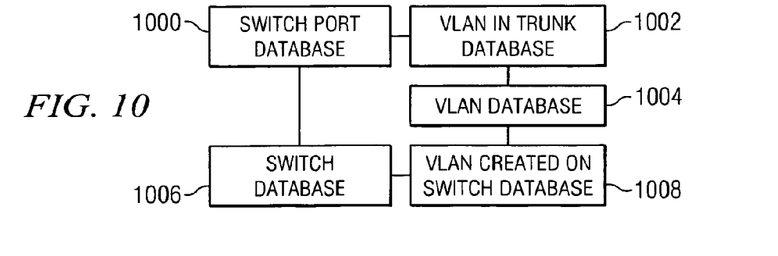
FIG. 10 shows a block diagram of a data structure that may be used to implement broadcast domain aggregation and segregation in accordance with an embodiment of the present invention.

FIG. 10 shows a block diagram of a data structure that may be used to implement broadcast domain aggregation and segregation in accordance with an embodiment of the present invention. Switch port database 1000 contains information regarding switch port number, switch port name, trunking attributes, and other information related to switch ports within the relevant network. VLAN in trunk database 1002 contains a list of VLANs carried through each switch endpoint in the relevant network. VLAN database 1004 contains information related to the name of VLANs, number of VLANs, and other information related to VLANs on the relevant network. Switch database 1006 contains information regarding the name of switches within the network, the type of switches within the network, the number of ports on the switches, and other information relating to switches located on the relevant network. VLAN created on switch database 1008 contains information relating to a list of VLANs created on each switch on the relevant network. Together, databases 1000, 1002, 1004, 1006, and 1008 form a group of databases from which an operator or a script may access all information needed to aggregate or segregate broadcast domains as described elsewhere herein.

Figure 11:
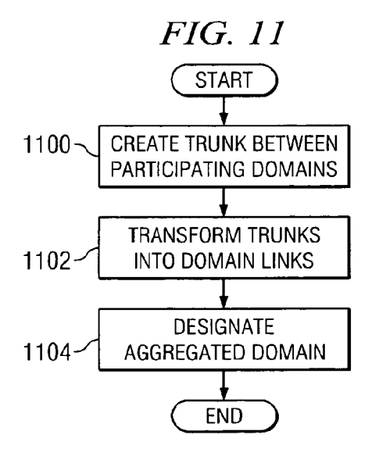
FIG. 11 is a flowchart illustrating a method of aggregating broadcast domains of VLANs in accordance with an embodiment of the present invention.

FIG. 11 is a flowchart illustrating a method of aggregating broadcast domains of VLANs in accordance with an embodiment of the present invention. The method shown in FIG. 11 may be implemented in the broadcast domains shown in FIG. 8A using systems shown in FIG. 1, FIG. 2, FIG. 3, FIG. 6, and FIG. 7. Regarding implementation, every switch has an operating system which handles user commands. Creating VLANs on switches, changing switch port attributes, and carrying VLANs through switch ports are all native commands of those operating systems. Examples of switch operating systems include CatOS and IOS provided by Cisco™ Corporation. The configuration process can be automated using EXPECT scripts. In this case, a routine in the script will try to login to the switch. The switch sends back a username prompt, which is intercepted by the script. The script provides a username. The script implements a similar process with respect to a request for passwords by a switch. The script also contains instructions for implementing the required commands to implement broadcast domain aggregation.

Initially, an operator or script creates a trunk between participating domains (step 1100) by issuing commands to the appropriate switches, as described above. Next, the process transforms the trunks into domain links (step 1102). As described above, a domain link carries common VLAN information between switches involved in the aggregation process.

Once the trunk established, the operator or the script adds the domain discriminator, or the VLAN which defines the domain, to the trunk. Consequently, both endpoints of the trunk should be able to forward data link layer frames tagged with the VLAN number. For example, the administrator or the script will run the command "set trunk f0/1 100," where f0/1 is the endpoint and 100 is the VLAN number. When the first VLAN has been added to both endpoints, a domain link is established and the two separated domains will be merged into one larger domain. In addition, because one trunk can be used for multiple VLANs, the same command with a different VLAN numbers can be used to add additional VLANs. Optionally, the aggregated VLAN may be designated with a name or other information (step 1104), with the process terminating thereafter.

Figure 12:
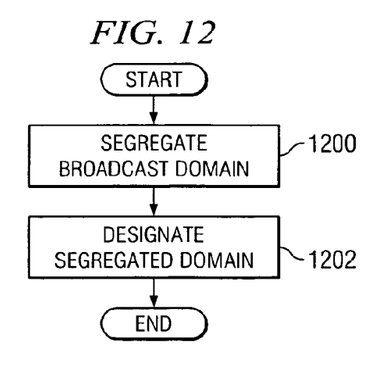
FIG. 12 is a flowchart illustrating a method of segregating broadcast domains of VLANs in accordance with an embodiment of the present invention.

FIG. 12 is a flowchart illustrating a method of segregating broadcast domains of VLANs in accordance with an embodiment of the present invention. The method shown in FIG. 12 may be implemented in the broadcast domain shown in FIG. 9A using systems shown in FIG. 1, FIG. 2, FIG. 3, FIG. 6, and FIG. 7. The method shown in FIG. 12 may be implemented in a similar manner as that shown in FIG. 11, such as by an operator or by a script. In the illustrative example shown in FIG. 12, a script implements the process shown.

Initially, a script segregates a broadcast domain into multiple broadcast domains (step 1200). As described above, segregation may be accomplished by at least one of two methods. First, the script may be used to remove a node may from a broadcast domain. In this case, the script removes a VLAN from a switch, causing one broadcast domain to segregate into at least two sub-domains. Second, the script may remove the link between two nodes by stopping propagation of a domain discriminator between nodes or by removing the logical connection between VLANs. In the former case, the logical connection, or trunk, between nodes exists; however, the domain discriminator is not propagated along the trunk. In the latter case, the script effects removal of the trunk.

After segregation is accomplished, the initial broadcast domain is effectively segregated into multiple broadcast sub-domains. Optionally, the segregated VLANs may be designated with names or other information (step 1202), with the process terminating thereafter.

The mechanism of embodiments of the present invention has several advantages over currently available methods for establishing and segregating virtual local area networks. Establishing VLANs, segregating VLANs, or otherwise manipulating VLANs in a data link layer topology may be accomplished using a minimum number of steps. Establishing or segregating VLANs may be accomplished with a single command by establishing or segregating broadcast domains as described above. Thus, the mechanism of embodiments of the present invention avoids physical manipulation of switches and avoids a time-consuming analysis of logical connections between switches and data processing systems.

It is important to note that while embodiments of the present invention have been described in the context of a fully functioning data processing system, those of ordinary skill in the art will appreciate that the processes of embodiments of the present invention are capable of being distributed in the form of a computer usable medium of instructions and a variety of forms and that embodiments of the present invention apply equally regardless of the particular type of signal bearing media actually used to carry out the distribution. Examples of computer usable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer usable media may take the form of coded formats that are decoded for actual use in a particular data processing system.

The description of embodiments of the present invention have been presented for purposes of illustration and description, and are not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method of managing VLANs, said method comprising:
    establishing a first broadcast domain, said first broadcast domain including a first VLAN;
    establishing a second broadcast domain, said second broadcast domain including a second VLAN;
    establishing a third broadcast domain such that the third broadcast domain replaces the first broadcast domain and the second broadcast domain, and wherein the first VLAN and the second VLAN are included in the third broadcast domain such that the first VLAN directly communicates with the second VLAN; and
    after establishing the third broadcast domain, segregating the third broadcast domain into a fourth broadcast domain and a fifth broadcast domain, wherein the fourth broadcast domain includes the first VLAN and the fifth broadcast domain includes the second VLAN, wherein the step of segregating the third broadcast domain is accomplished by removing the trunk between the first broadcast domain and the second broadcast domain.

2. The method of claim 1 A method of managing VLANs, said method comprising:
    establishing a first broadcast domain, said first broadcast domain including a first VLAN:
    establishing a second broadcast domain, said second broadcast domain including a second VLAN;
    establishing a third broadcast domain such that the third broadcast domain replaces the first broadcast domain and the second broadcast domain, and wherein the first VLAN and the second VLAN are included in the third broadcast domain such that the first VLAN directly communicates with the second VLAN; and
    after establishing the third broadcast domain, segregating the third broadcast domain into a fourth broadcast domain and a fifth broadcast domain, wherein the fourth broadcast domain includes the first VLAN and the fifth broadcast domain includes the second VLAN, wherein the step of segregating the third broadcast domain is accomplished by stopping propagation of a domain discriminator from a first node in the first broadcast domain to a second node in the second broadcast domain.

3. A data processing system for managing a network, said data processing system comprising:
    a bus;
    a communication adapter operably connected to the bus, said communication adapter operable to communicate with the network a memory operably connected to the bus, said memory containing a set of instructions;
    a processor operably connected to the bus, said processor adapted to execute the instructions to:
    establish a first broadcast domain, said first broadcast domain including a first VLAN in the network;
    establish a second broadcast domain, said second broadcast domain including a second VLAN in the network;
    establish a third broadcast domain such that the third broadcast domain replaces the first broadcast domain and the second broadcast domain, and wherein the first VLAN and the second VLAN are included in the third broadcast domain such that the first VLAN directly communicates with the second VLAN; and
    after establishing the third broadcast domain, segregate the third broadcast domain into a fourth broadcast domain and a fifth broadcast domain, wherein the fourth broadcast domain includes the first VLAN and the fifth broadcast domain includes the second VLAN, wherein the processor executes the instructions to segregate the third broadcast domain by executing the instructions to remove a node from the third broadcast domain.

4. The data processing system of claim 3 A data processing system for managing a network, said data processing system comprising:
    a bus:
    a communication adapter operably connected to the bus, said communication adapter operable to communicate with the network
    a memory operably connected to the bus, said memory containing a set of instructions;
    a processor operably connected to the bus, said processor adapted to execute the instructions to:
    establish a first broadcast domain, said first broadcast domain including a first VLAN in the network;
    establish a second broadcast domain, said second broadcast domain including a second VLAN in the network;
    establish a third broadcast domain such that the third broadcast domain replaces the first broadcast domain and the second broadcast domain, and wherein the first VLAN and the second VLAN are included in the third broadcast domain such that the first VLAN directly communicates with the second VLAN; and after establishing the third broadcast domain, segregate the third broadcast domain into a fourth broadcast domain and a fifth broadcast domain, wherein the fourth broadcast domain includes the first VLAN and the fifth broadcast domain includes the second VLAN, wherein the processor executes the instructions to segregate the third broadcast domain by executing the instructions to remove the trunk between the first broadcast domain and the second broadcast domain.

* * * * *